US006304816B1

(12) United States Patent
Berstis

(10) Patent No.: US 6,304,816 B1
(45) Date of Patent: Oct. 16, 2001

(54) METHOD AND APPARATUS FOR AUTOMATIC TRAFFIC CONDITIONS DATA COLLECTION USING A DISTRIBUTED AUTOMOTIVE COMPUTING SYSTEM

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,252

(22) Filed: Jan. 28, 1999

(51) Int. Cl.[7] .............................. G06F 19/00; G06G 7/70

(52) U.S. Cl. .............................. 701/117; 701/2; 701/118; 340/905; 340/907; 340/934

(58) Field of Search .............................. 701/2, 117, 118, 701/119; 340/905, 286.14, 825.72, 933, 934, 936, 906, 907

(56) References Cited

U.S. PATENT DOCUMENTS

| | | | | |
|---|---|---|---|---|
| 4,706,086 | | 11/1987 | Panizza | 340/902 |
| 4,792,803 | | 12/1988 | Madnick et al. | 340/905 |
| 5,082,333 | | 1/1992 | Fukushima et al. | 303/96 |
| 5,508,930 | | 4/1996 | Smith, Jr. | 364/444 |
| 5,539,645 | * | 7/1996 | Mandhyan et al. | 701/119 |
| 5,612,882 | | 3/1997 | LeFebvre et al. | 364/449 |
| 5,719,565 | | 2/1998 | Tsuno et al. | 340/905 |
| 5,719,771 | | 2/1998 | Buck et al. | 364/443 |
| 5,818,356 | | 10/1998 | Schuessler | 340/995 |
| 5,889,477 | * | 3/1999 | Fastenrath | 340/905 |
| 5,933,100 | * | 8/1999 | Golding | 340/995 |
| 6,073,062 | * | 6/2000 | Hoshino et al. | 701/3 |

* cited by examiner

*Primary Examiner*—Tan Nguyen
*Assistant Examiner*—Gertrude Arthur
(74) *Attorney, Agent, or Firm*—Jeffrey S. LaBaw; Duke W. Yee

(57) ABSTRACT

A method and apparatus for collecting data on traffic conditions from a distributed automotive computing system having a plurality of automotive computing systems. Data regarding traffic conditions is collected from each of the plurality of distributed automotive computing systems, wherein each of the plurality of automotive computing systems is located in a plurality of automobiles, wherein the data is collected data. The collected data is compared with current data regarding traffic conditions. Changes present between the collected data regarding traffic conditions with the current data regarding traffic conditions is identified. The changes are sent to selected automotive computing systems within the plurality of automotive computing systems.

25 Claims, 6 Drawing Sheets

LR
LB1
LB2
LB3
LB1(MB1)
LB2(MB2)
LB3(MB3)
K1
K2
K3
FZ1
FZ2
FZ3
LP0
LP1
LP2
LP3
LP4
LP5
LP6
LP7
LP8
LV1
LV2
LV3
LV4
LV5
LV8
A

N
W1
W2
S1
S2

SB21 | SB23 | SB22 | SB24

LB: 1
VK: 1

| LP | x | y | s′ | w′ | s | w | t | h | a |
|---|---|---|---|---|---|---|---|---|---|
| 0 | 120 | 580 | | | | | | | |
| 1 | 165 | 580 | (46) | (88) | 45 | 90 | 3 | – | – |
| 2 | 165 | 530 | (52) | (178) | 50 | 180 | 2 | – | – |
| 3 | 205 | 505 | (49) | (118) | 48 | 120 | 10 | 7 | – |
| 4 | 245 | 505 | 41 | 89 | 40 | 90 | 5 | – | – |
| 5 | 290 | 505 | | | 45 | 90 | | | |
| 8 | 330 | 505 | | | 40 | 90 | | | |

| LB / VK / LP | 1: z | 1: t̄ | 1: h̄ | 1: ā | 2: z | 2: t̄ | 2: h̄ | 2: ā |
|---|---|---|---|---|---|---|---|---|
| 1 | 74 | 4 | 1 | 0 | " | " | " | " |
| 2 | 74 | 2 | — | 0 | " | " | " | " |
| 3 | 74 | 8 | 6 | 1 | " | " | " | " |
| 4 | 74 | 6 | — | 0 | " | " | " | " |
| 5 | 74 | 5 | 1 | 0 | " | " | " | " |
| 8 | 91 | 12 | 7 | 8 | " | " | " | " |
| | — | | | | " | " | " | " |
| | — | | | | " | " | " | " |

| LB / VK / LP | 1: z* | 1: t* | 1: h* | 1: a* |
|---|---|---|---|---|
| 1 | 100 | 6 | — | 5 |
| 2 | 100 | 5 | — | 5 |
| 3 | 80 | 15 | 10 | 5 |
| 4 | 100 | 10 | — | 5 |
| 5 | 100 | 10 | — | 5 |
| 8 | 120 | 18 | 20 | 5 |
| | — | | | |
| | — | | | |

| LB / VK | 1: % | 2 |
|---|---|---|
| 1 | 80 | |
| 2 | 20 | |

| LB / VK | 1: a | 2 |
|---|---|---|
| 1 | 6 | |
| 2 | 0 | |

METHOD AND APPARATUS FOR AUTOMATIC TRAFFIC CONDITIONS DATA COLLECTION USING A DISTRIBUTED AUTOMOTIVE COMPUTING SYSTEM

BACKGROUND OF THE INVENTION

1. Technical Field

The present invention relates generally to an improved data processing system and in particular to a method and apparatus for collecting data. Still more particularly, the present invention relates to a method and apparatus for collecting data regarding traffic conditions through a distributed automotive computing system.

2. Description of Related Art

The use of computers has become more and more pervasive in society. This pervasiveness includes the integration of personal computers into vehicles. The utilization of computer technology is employed to provide users or drivers with a familiar environment. In this manner, a user's ability to easily use computing resources in an automobile is provided. In addition, it is envisioned that car buyers would be able to use most of the same software elements in an automobile that are used at home or in the office. In addition, an automobile owner could completely customize driver information displays to create an optimal environment for the driver's needs. Various platforms have been developed and are being developed for use in automobiles. Many platforms provide the computing strength of a personal computer platform with widely recognized as well as emerging technologies. Widely accepted technologies that may be implemented within an automobile include, cellular/global system for mobile communications (GSM), global positioning system (GPS), and radio data broadcast (RDB). These devices allow a driver to navigate, receive real-time traffic information and weather forecasts, access databases of personalized information, and place and receive telephone calls, as well as send and receive email and faxes from an automobile. Emerging technologies that are being integrated into computing platforms for automobiles include the universal serial bus (USB) and the digital video disk (DVD).

Another key feature for adapting computer technologies for use in an automobile is a voice recognition interface (VUI) for the driver along with a more conventional graphical user interface (GUI) for passengers. Voice recognition technology is already well developed in multi-media desktop personal computers. For example, VoiceType family products available from International Business Machines Corporation may be also used in the automobile. Voice recognition technology would allow drivers to easily control and interact with onboard computers and telephone applications, including productivity software, internet browsers, and other applications while allowing the driver to keep their hands on the wheel and their eyes on the road. Such a productivity is especially important when some surveys show that up to twelve percent of a person's waking life is spent in an automobile.

Computing systems are currently being developed for automobiles to guide drivers from point A to point B using GPS data, traffic data, weather data, etc. Collecting all of this data, however, is a difficult job. It is especially difficult to collect this data in a timely manner.

Therefore, it would be advantageous to have an improved method and apparatus for collecting data on traffic conditions.

SUMMARY OF THE INVENTION

The present invention provides a method for collecting data on traffic conditions from a distributed automotive computing system having a plurality of automotive computing systems. Data regarding traffic conditions is collected from each of the plurality of distributed automotive computing systems, wherein each of the plurality of automotive computing systems is located in a plurality of automobiles, wherein the data is collected data. The collected data is compared with current data regarding traffic conditions. Changes present between the collected data regarding traffic conditions with the current data regarding traffic conditions is identified. The changes are sent to selected automotive computing systems within the plurality of automotive computing systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 2:
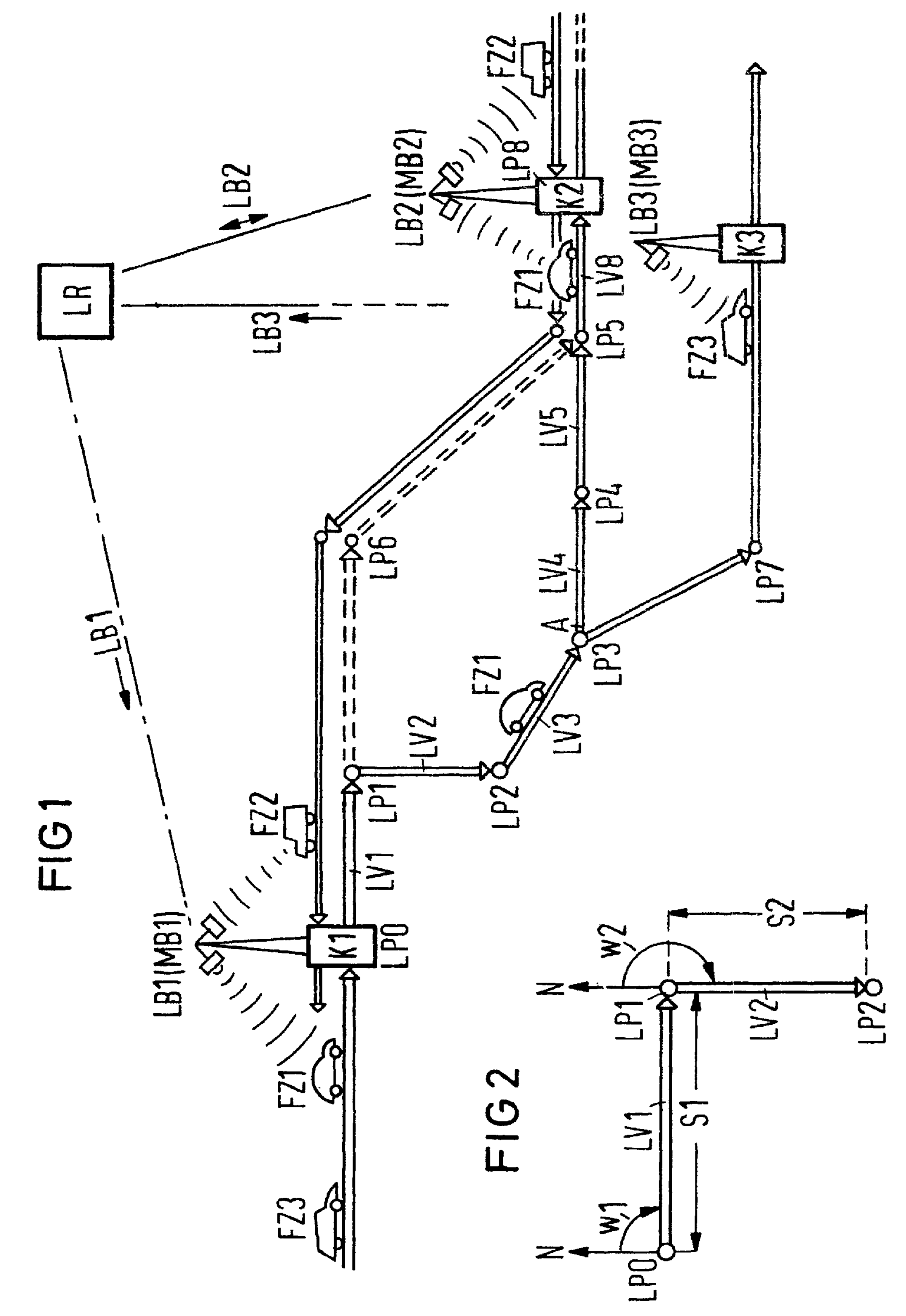
FIG. 1 is a diagram of a computing system in accordance with a preferred embodiment of the present invention.
FIG. 2 is a block diagram depicting a data processing system in accordance with a preferred embodiment of the present invention.

With reference now to the figures and in particular with reference to FIG. 1, a diagram of a computing system 100 is depicted in accordance with a preferred embodiment of the present invention. In this example, head-end 102 is connected to a server computer 104, which is employed to collect data from various automotive computing platforms that may be present within computing system 100. In particular, server computer 104 may communicate with various mobile units 106–114, which are automobiles in the depicted example. These automobiles each contain a computing platform, which may communicate with server 104. In this example, communications between various mobile units may be accomplished through a cellular phone system or through an iridium satellite phone systems or other wireless systems.

Communications between server computer 104 and mobile units 106–114 is accomplished in a number of different ways in this example. For example, radio tower 116 provides communications links 118 and 120 to mobile units 108 and 106 respectively. Communications links 118 and 120 are radio frequency communications links generated between radio tower 116 and antennas located at mobile units 106 and 108. In addition, server 104 may communicate with mobile unit 110 through communications links 122 and 124. Communications link 122 is established between satellite dish 126 and satellite switch 128 with communications link 124 being established between satellite 128 and mobile unit 110. Communications links 122 and 124 are radio frequency based links generated by signals sent to satellite switch 128 from satellite dish 126 and from satellite switch 128 to mobile unit 110. In this example, radio tower 116 and satellite dish 126 are connected to head-end 102 and provide for transmissions originating from or passing through head-end 102.

Further, signals may be sent from satellite switch 128 to satellite dish 130 via communications link 132. From satellite dish 130, information may be sent to mobile unit 114 through communications link 134, 136, and 140. Communications link 134 in this example is a link between switch 142 and switch 144. In this manner, a path may be established from server computer 104 to mobile unit 114 to create a path containing communications links 122, 132, 134, 136, and 140. Communications link 134 is a physical link, which may be for example, coaxial cable, fiber optic cable, or a combination of the two. Each switch also has a "link", also called a "path" within the switch for writing data through the switch. An "input link" is the input or source portion of the link associated with the input into the switch, and an "output link" is the output or destination portion of the link associated with the output from the switch. Communications link 136 is established between radio towers 146 and 148. Radio tower 146 is connected to switch 144 in FIG. 1. Communications link 140 is established between radio tower 148 and mobile unit 114. Communications with mobile unit 112 may be established through a path containing communications links 122, 132, and 150. Communications link 150 is established between radio tower 151 and mobile unit 112. In this example, satellite dish 130 and radio tower 151 are connected to switch 142.

In addition, server computer 104 may use an alternate path to communicate with mobile unit 114. For example, a path through communications links 152, 154, 136, and 140 may be employed to communicate with mobile unit 114. Links 152 and 154 are physical links in this example. Communications link 152 is established between head-end 102 and switch 156, while communications link 154 is established between switch 156 and switch 144. In this manner, data signals, such as multi-media data, which may include video, graphics, voice, and text may be sent between server computer 104 and mobile units 106–114. These data signals may also include information about traffic conditions, such as the amount of traffic, weather, accidents, construction, and other conditions affecting the movement of traffic.

Referring to FIG. 2, a block diagram depicts a data processing system, which may be implemented as a server, such as server computer 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to transmitters in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as an optical disk drive and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
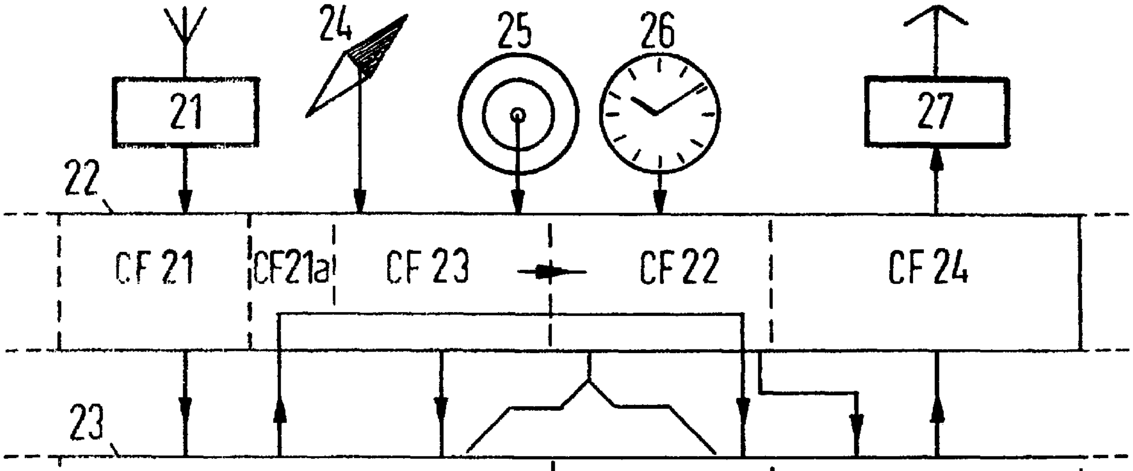
FIG. 3 is a block diagram of an automotive computing platform in accordance with a preferred embodiment of the present invention.

Turning next to FIG. 3, a block diagram of an automotive computing platform is depicted in accordance with a preferred embodiment of the present invention. Computing platform 300 is located within a vehicle, such as an automobile or truck. Computing platform 300 includes a CPU 302, which may be an embedded processor or processor such as a Pentium processor from Intel Corporation. "Pentium" is a trademark of Intel Corporation. Computing platform 300 also includes memory 304, which may take the form of random access memory (RAM) and/or read only memory (ROM).

Computing platform 300 also contains a storage device unit 306. Storage device unit 306 may contain one or more storage devices, such as, for example, a hard disk drive, a flash memory, a DVD drive, or a floppy disk. Computing platform 300 also includes an input/output (I/O) unit 308, which provides connections to various I/O devices. In this example, a GPS receiver 310 is included within computing platform 300 and receives signals through antenna 312. Wireless unit 314 provides for two-way communications between computing unit 300 and another data processing system, such as sever 104 in FIG. 1. Communications are provided through antenna 316. In addition, inertial navigation unit 318 is connected to I/O unit 308. Inertial navigation unit 318 is employed for navigation when GPS receiver 310 is unable to receive a usable signal or is inoperable.

A multitude of different sensors 320 also are connected to I/O unit 308. These sensors may include, sensors that detect speed, unusually high acceleration forces, airbag deployment, extensive speed up and slow down cycles, dropping out of cruise control, brake use, anti-lock brakes occurrences, traction control use, windshield wiper use, turning on or off of lights for the automobile, and outside light levels. In addition, sensors 320 may include sensors for detecting steering wheel movement, temperature, the state of door locks, and the state of windows. In other words, almost any condition or parameter about or around an automobile may be detected through the use of sensors 320.

Computing platform 300 also includes a display adapter 322, which is connected to display 324. In the depicted example, this display is a touch screen display. Alternatively or in addition to a touch screen display, display 324 also may employ a heads-up display projected onto the windshield of the automobile. Computing unit 300 also includes a microphone 328 and a speaker 330 to provide a driver with an ability to enter commands and receive responses through speech I/O 326 without having to divert the driver's attention away from the road, or without the driver having to remove the driver's hands from the steering wheel.

The present invention provides a method, apparatus, and instructions for automatically detecting and reporting traffic conditions and to report these traffic conditions to a central data base for other users in a distributed automotive computing system to use. Various computing platforms located on mobile units, such as automobiles and trucks, may report information collected from sensors located on the mobile units to a central database. This central database may be located at a computer, such as server 104 in computing system 100 in FIG. 1. In the depicted examples, traffic conditions are automatically detected and reported without requiring intervention from a user. In addition, user initiated reports sent to the central database also may be employed. The reports collected at the central database are compared to data regarding current traffic conditions. Differences between the current traffic conditions and the reported traffic conditions from the various computing platforms are identified. With these changes in conditions, updates may be returned to one or more of the mobile units. For example, these updates may include alerts regarding various hazardous road or weather conditions such as ice or heavy rain. The detection of ice or heavy rain may be indicated through the number of times various computing units report the occurrence of the use of anti-lock brakes, traction control, or high speed windshield wiper use. Updates also may include alternate routes for users who have previously made routing requests.

The present invention may be especially useful in rerouting users on various trips. Most mapping information is typically stored locally in the automobile on a CD, DVD, or other storage media. At the start of a trip and perhaps at other times during longer trips, however, the computing platform may connect to a server computer to obtain update information on current traffic and weather conditions in the areas. This information may be used to route the driver around problem areas to more quickly reach the driver's destination. If, however, the server computer identifies the driver's progress is unusually slow or fast, given the last reported conditions, the computing platform may automatically connect via a suitable wireless connection to the server computer and inform the server computer that the conditions on the particular section of the road have changed. These new conditions can be relayed to other driver's embarking on trips or those who have not reached a troubled area and perhaps those receiving more than one search report or verifying new information in another way to account for vehicle problems or someone driving in an irresponsible manner.

Figure 4:
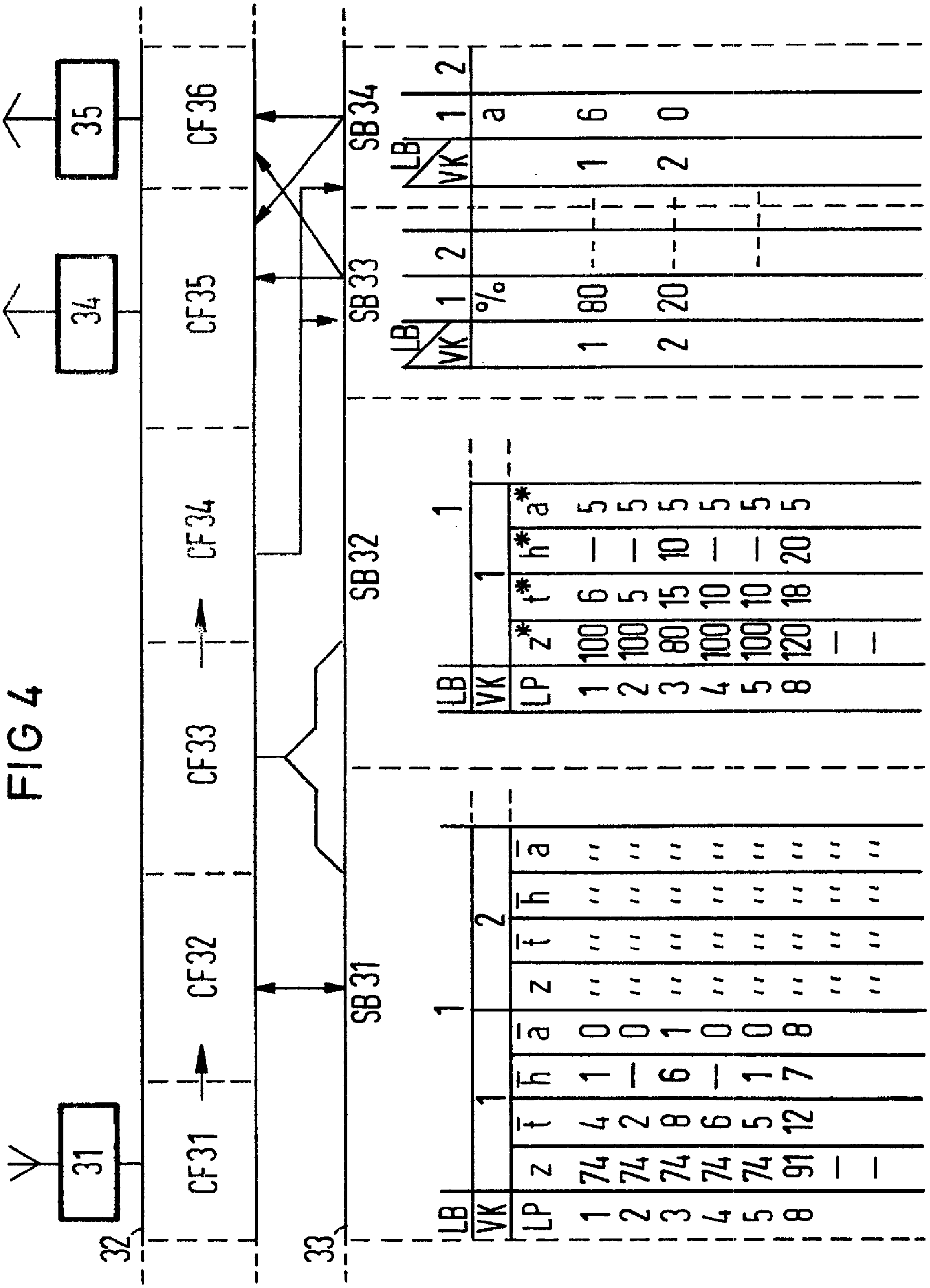
FIG. 4 is a diagram of a map displayed on a display device in accordance with a preferred embodiment of the present invention.

With reference now to FIG. 4, a diagram of a map displayed on a display device, such as display 324 in computing platform 300 is depicted in accordance with a preferred embodiment of the present invention. In this example, map 400 illustrates a start point 402 and a destination point 404 on map 400. In this example, a route 406 has been provided to the driver to guide the driver to destination point 404 from start point 402. Currently, the driver is located at point 406. Section 408 is a section of road 410 with wide spread trouble reported from other computing platforms located within section 408. In such a case, the computing platforms located in section 408 will send data regarding traffic conditions back to the server, which identifies section 408 as being a problem area.

Normally, the driver would be directed to destination 404 through route 412, but in this instance, since trouble is detected in section 408, which is along route 412, an alternate route 414 is identified and sent to the user as an update. In this manner, the user may avoid the trouble in section 408 and still reach destination point 404 in a reasonable amount of time. In identifying alternate routes, the alternate routes identified will typically be those that do not provide a longer arrival than the original route.

Figure 5:
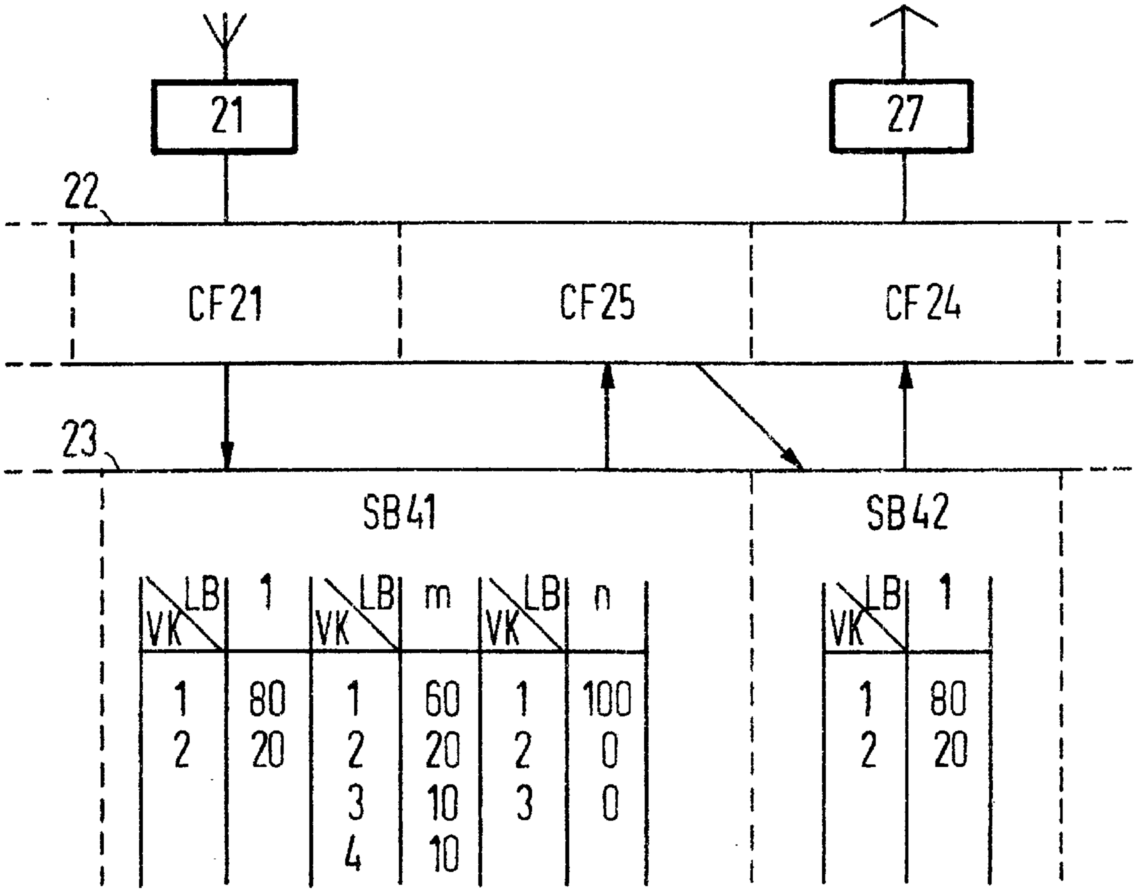
FIG. 5 is a flowchart of a process employed by a computing platform in accordance with a preferred embodiment of the present invention.

With reference now to FIG. 5, a flowchart of a process employed by a computing platform is depicted in accordance with a preferred embodiment of the present invention. The process begins by retrieving data from the sensors connected to or in communication with the computing platform (step 500). Next, a determination is made as to whether an abnormal condition has been detected (step 502). An abnormal condition may include a number of situations. For example, the detection of a deployment of an airbag would be an example of an abnormal condition. A sudden de-acceleration of the vehicle from a speed of sixty-five miles per hour to zero on a highway would also be considered an abnormal condition. The use of windshield wipers at high speed also may be considered an abnormal condition for indicating poor or severe weather.

If an abnormal condition is detected, the data regarding these traffic conditions is transmitted to the server (step 504) with the process then returning to step 500. If an abnormal condition is not identified, a determination is made as to whether the data received from the sensors reached some selective threshold (step 506). For example, the threshold may be the engagement of brakes more than a selective number of times over a set period of time. This threshold may be used to indicate poor traffic conditions. Alternatively, the threshold may be a period of time after which data is always sent to the server for analysis. This situation would involve the sending of data, such as, for example, temperature, speed of the automobile, or excessive lane changes. Excessive lane changes may be indicated through the detection of steering wheel movements and the speed of the vehicle. If the threshold is reached, data is then transmitted to the server (step 504) with the process then returning to step 500. Otherwise, the process returns to step 500.

Figure 6:
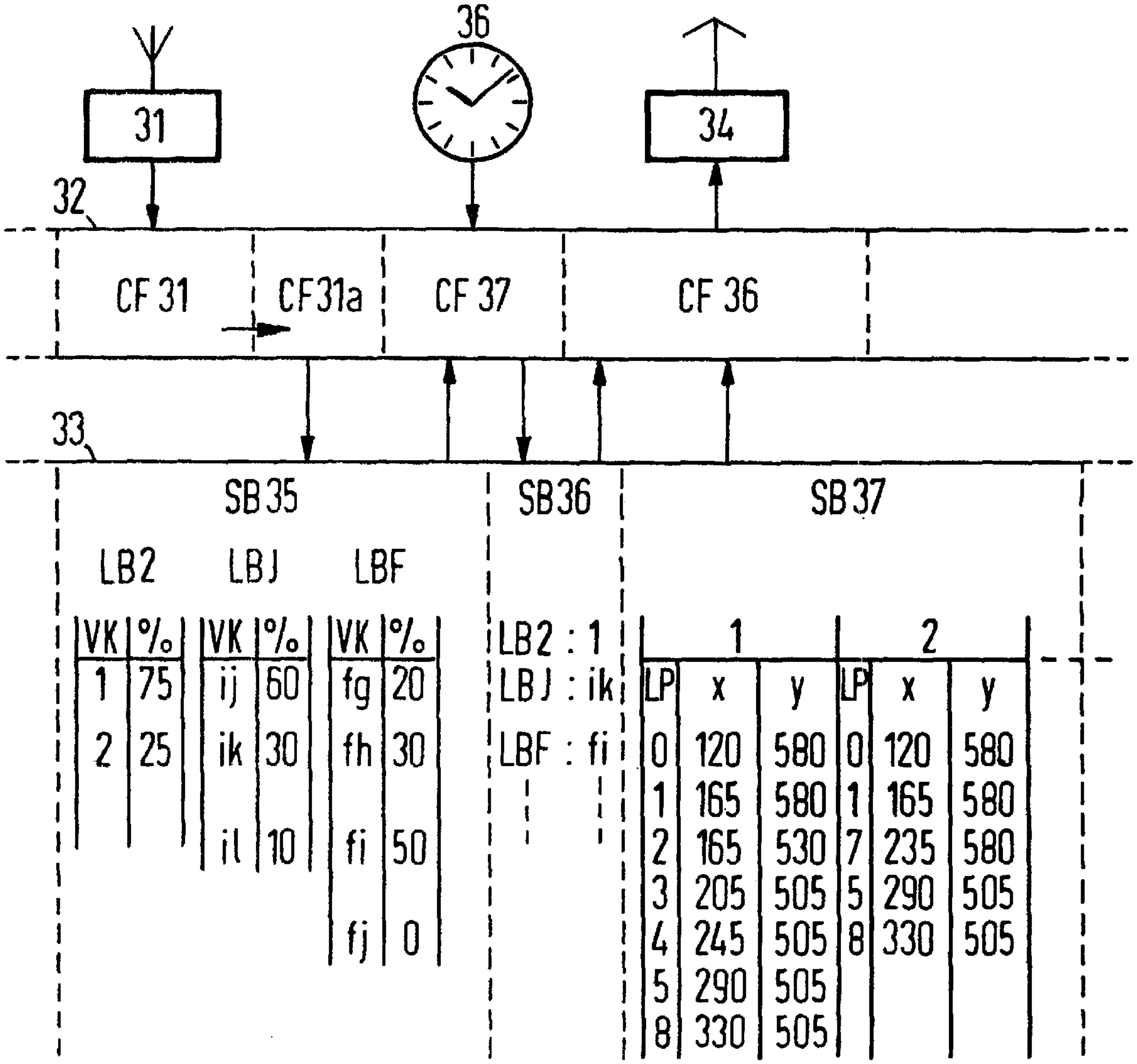
FIG. 6 is a flowchart of a process used by a computing platform update in accordance with a preferred embodiment of the present invention.

With reference now to FIG. 6, a flowchart of a process used by a computing platform update is depicted in accordance with a preferred embodiment of the present invention. The process begins by receiving an update from the server computer (step 600). This update may be received through radio frequency transmissions to the wireless unit connected to the automotive computing platform. When the update is received, it is then presented to the user (step 602) with the process terminating thereafter. The update can be presented to the user in a number of different ways. For example, it may be in the form of an indication of an alternate route, such as alternate route 414 in map 400 in FIG. 4. In addition, the length of delay may be presented if the delay can be deduced from the collected data. The user may approve or select the alternate route. In such an instance, the alternate route replaces the original route with navigation and tracking continuing using the alternate route. Alternatively, other presentations may be made both verbally and visually.

Update alerts, such as upcoming bad weather conditions, may be reported to the driver by a verbal presentation.

Figure 7:
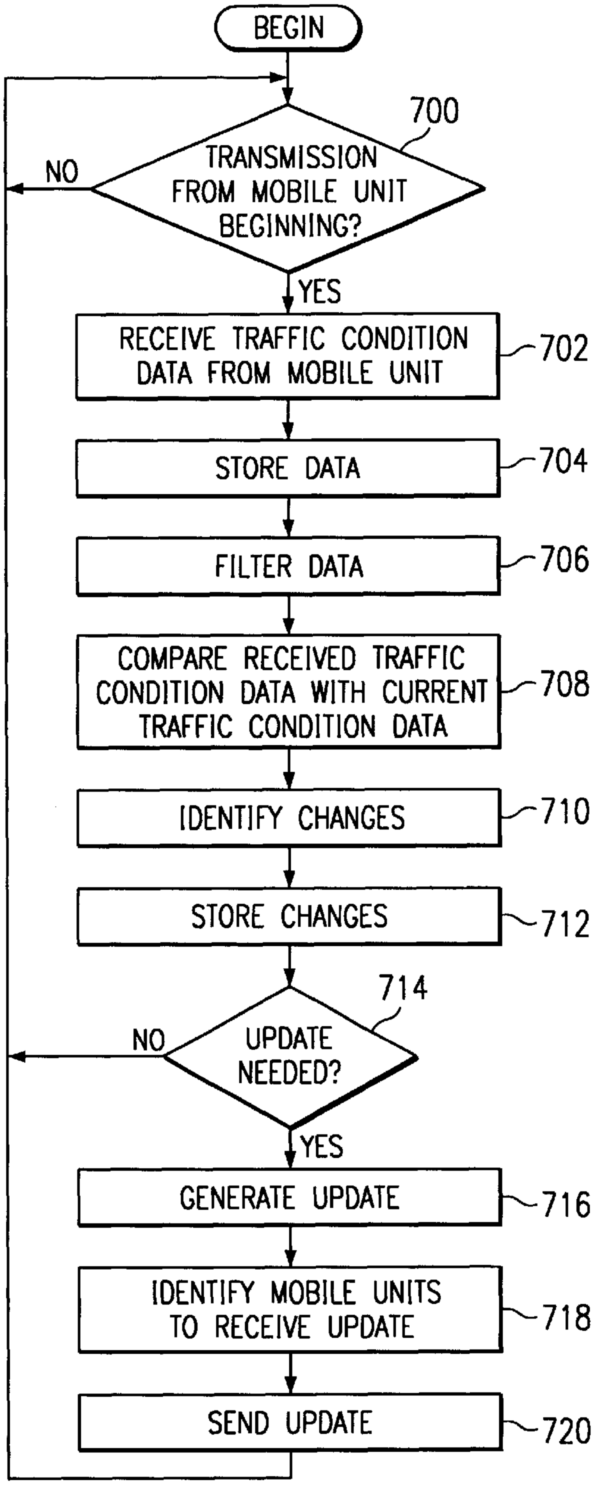
FIG. 7 is a flowchart of a process used by a server computer in accordance with a preferred embodiment of the present invention.

With reference to FIG. 7, a flowchart of a process used by a server computer is depicted in accordance with a preferred embodiment of the present invention. The process begins by determining whether a transmission from a mobile unit, reporting data, is beginning (step 700). If a transmission is not detected, the process returns to step 700. Upon detecting reception of a transmission, traffic condition data is received from a mobile unit (step 702). The data received from the mobile unit is then stored (step 704). The process then filters the data (step 706). The filtering of data in this example involves determining whether the data should be passed on for comparison. This filtering is used to take in account vehicle problems or irresponsible driving by various drivers. For example, if only one vehicle out of fifty has stopped at a particular area, the one vehicle may be experiencing mechanical problems. This is in contrast to a situation in which all fifty vehicles have been stopped on the road.

Thereafter, the received data regarding the traffic conditions reported by the mobile unit is compared with the current traffic condition data (step 708). Next, changes between the traffic conditions are identified (step 710). These changes are then stored (step 712). The storing of the changes in this example involves updating the current traffic data in the database.

Next, a determination is made as to whether an update is required (step 714). If an update is required, the update is generated (step 716). In some cases the changes in traffic conditions may not require updates being sent to the various mobile units. For example, if the changes detected are only a slight change in speed, the changes are noted, but updates are not required. On the other hand, if severe weather conditions are identified through the data received from the various mobile units regarding traffic conditions, an update in the form of a weather alert may be created. Thereafter, mobile units to receive the update are identified (step 718). This identification may be made by identifying units within the affected area or by identifying units having various routing requests. The update is then sent to the identified or selected mobile units (step 720) with the process then returning to step 700. With reference again to step 714, if an update is not required, the process then also returns to step 700.

Figure 8:
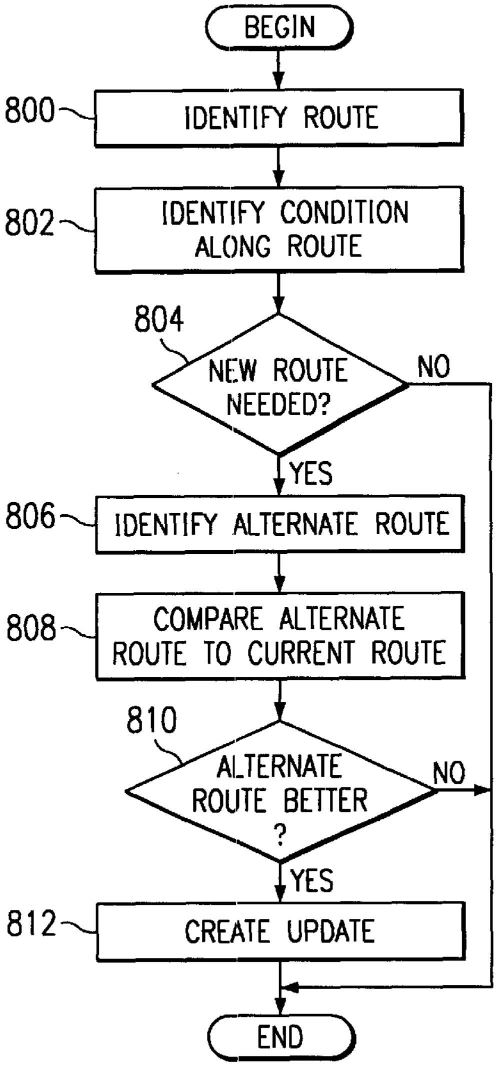
FIG. 8 is a flowchart of a process used by a server computer to generate a routing update in accordance with a preferred embodiment of the present invention.
Figure 1:
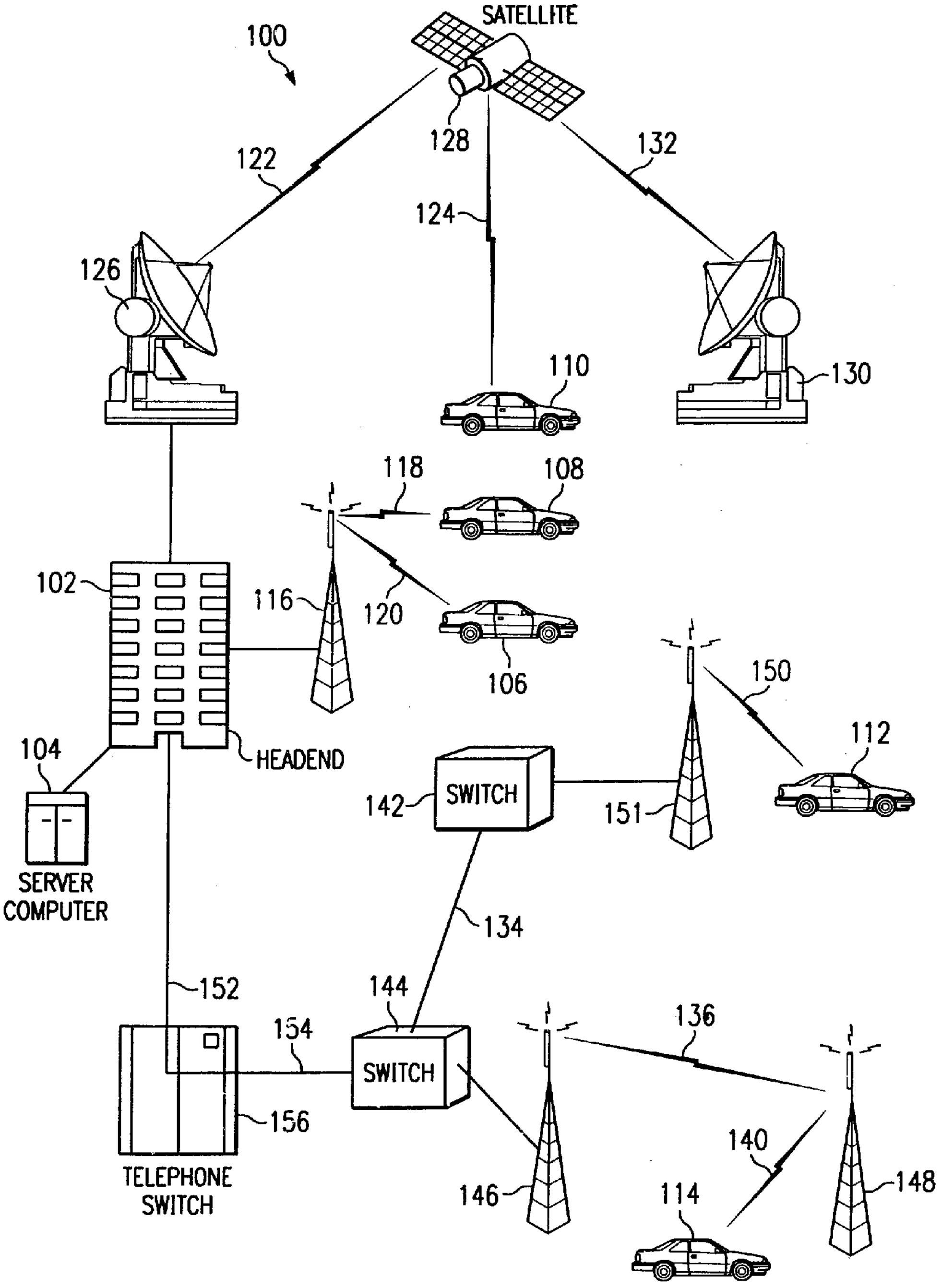
Figure 2:
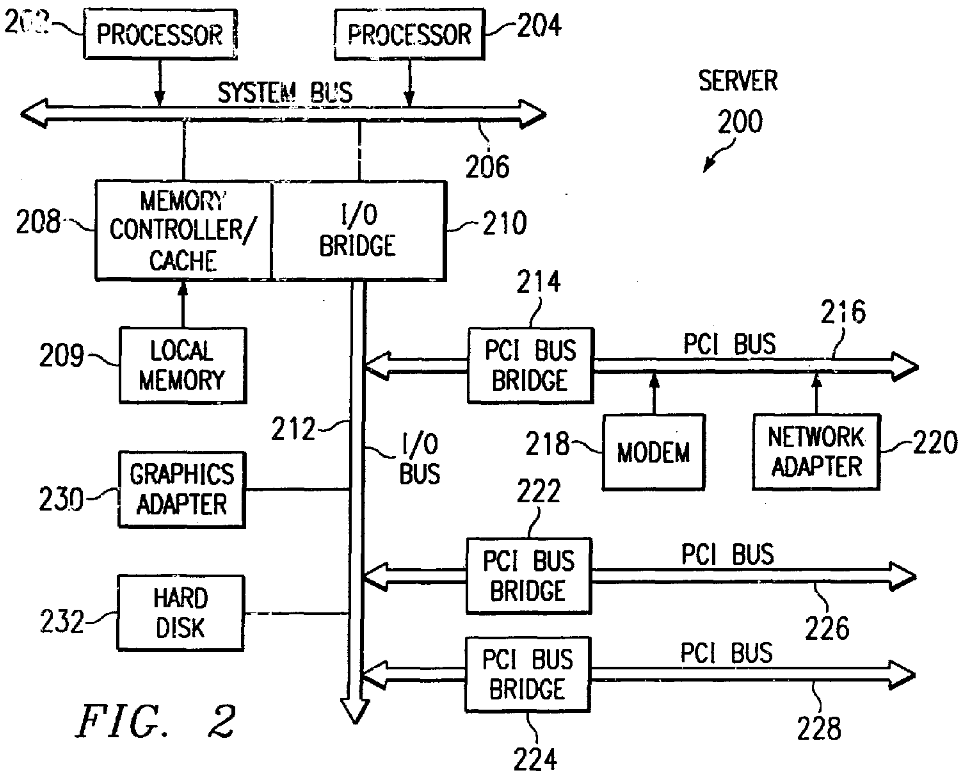
Figure 3:
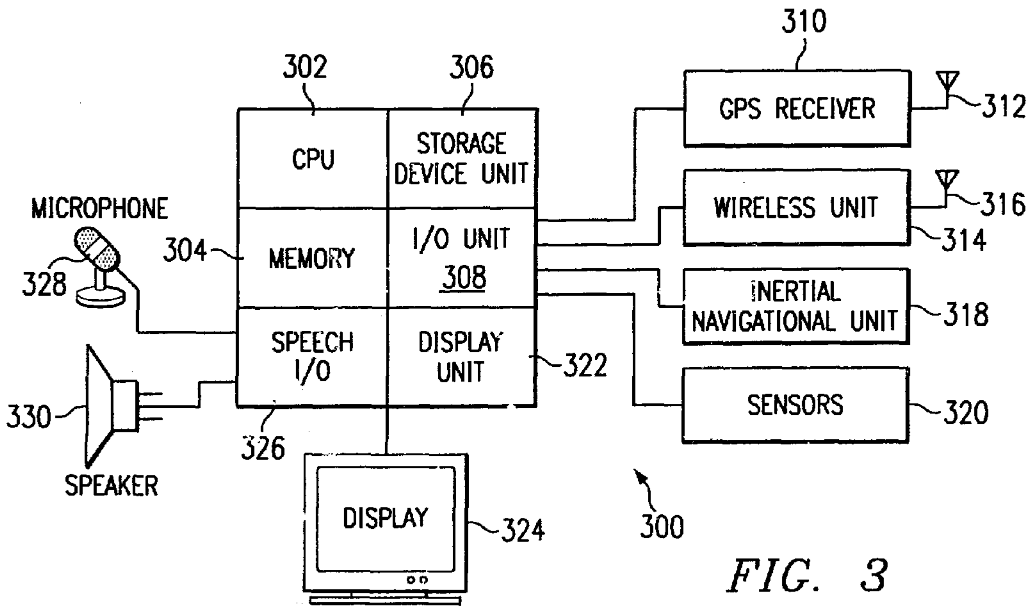

With reference now to FIG. 8, a flowchart of a process used by a server computer to generate a routing update is depicted in accordance with a preferred embodiment of the present invention. This update is generated when a determination is made in step 714 in FIG. 7 that an update is required. The process in FIG. 8 is a more detailed example of one update that may be generated in step 714 in FIG. 7. The process begins by identifying a route that has been previously requested by a driver (step 800). Thereafter, conditions are identified for the route using the database (step 802). Next, a determination is made as to whether a new route is required based on the data regarding the traffic conditions along the route (step 804). If a new route is needed, an alternate route is then identified (step 806). The alternate route is compared to the current route (step 808). This comparison step is employed to determine whether the alternate route will require more time to reach the driver's destination than the current route. A determination is made as to whether the alternate route is better than the current route (step 810). If the alternate route is better, an update is created (step 812) with the process terminating thereafter. This update will then be transmitted to the driver who requested the particular route identified in step 800. With reference again to step 810, if the alternate route is not better than the current route, the process then terminates. Optionally, an update could be created warning the driver of some delays and that no better alternative routes exist.

With reference again to step 804, if a new route is not needed, the process also terminates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples are directed toward automobiles, the processes of the present invention may be applied to other types of vehicles, such as utility vehicles, or truck in trucking fleets. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for collecting data on traffic conditions from a distributed vehicle computing system having a plurality of vehicle computing systems, the method comprising the computer implemented steps of:

collecting data regarding traffic conditions from each of the plurality of vehicle computing systems, wherein the plurality of vehicle computing systems are located in a plurality of vehicles, wherein the data is collected data;

comparing the collected data with current data regarding traffic conditions;

identifying changes present between the collected data regarding traffic conditions and the current data regarding traffic conditions; and sending the changes to selected vehicle computing systems selected from the plurality of vehicle computing systems.

2. The method of claim 1 further comprising the steps of:

updating the current data regarding traffic conditions with the changes.

3. The method of claim 1, wherein the current data regarding traffic conditions are stored in a storage device.

4. The method of claim 1, wherein the selected vehicle computing systems are all of the plurality of computing systems.

5. The method of claim 1 further comprising the step of:

selecting the selected vehicle computing systems based on prior trip routing requests.

6. The method of claim 1, further comprising the step of:

selecting the selected vehicle computing systems based on projected vehicle locations.

7. The method of claim 1, further comprising the step of:

selecting the selected vehicle computing systems based on a location of vehicle computing systems within the plurality of vehicle computing systems.

8. The method of claim 1, wherein the step of collecting data is achieved by monitoring sensors located within the plurality of vehicles containing the plurality of vehicle computing systems.

9. The method of claim 1, wherein the sensors include sensors for monitoring antilock brakes.

10. The method of claim 1, wherein the sensors include sensors for monitoring windshield wipers.

11. The method of claim 1, wherein the sensors include sensors for monitoring temperature.

12. The method of claim 1, wherein the plurality of vehicles are a plurality of automobiles.

13. The method of claim 1, wherein the plurality of vehicles is a plurality of trucks.

14. A data processing system for collecting data on traffic conditions from a distributed vehicle computing system having a plurality of vehicle computing systems, the data processing system comprising:

collecting means for collecting data regarding traffic conditions from each of the plurality of vehicle computing systems, wherein the plurality of vehicle computing systems are located in a plurality of vehicles, wherein the data is collected data;

comparing means for comparing the collected data with current data regarding traffic conditions;

identifying means for identifying changes present between the collected data regarding traffic conditions and the current data regarding traffic conditions; and sending means for sending the changes to selected vehicle computing systems selected from the plurality of vehicle computing systems.

15. The data processing system of claim 14 further comprising:

updating means for updating the current data regarding traffic conditions with the changes.

16. The data processing system of claim 14, wherein the current data regarding traffic conditions are stored in a storage device.

17. The data processing system of claim 14, wherein the selected vehicle computing systems are all of the plurality of vehicle computing systems.

18. The data processing system of claim 14 further comprising:

selecting means for selecting the selected vehicle computing systems within the plurality of vehicle computing systems based on prior trip routing requests.

19. The data processing system of claim 14, further comprising:

selecting means for selecting the selected vehicle computing systems based on projected vehicle locations.

20. The data processing system of claim 14, further comprising:

selecting means for selecting the selected vehicle computing systems based on location of vehicle computing systems within the plurality of vehicle computing systems.

21. The data processing system of claim 14, wherein collected data is achieved by monitoring sensors located within the plurality of automobiles containing the plurality of vehicle computing systems.

22. The data processing system of claim 14, wherein the sensors include sensors for monitoring antilock brakes.

23. The data processing system of claim 14, wherein the sensors include sensors for monitoring windshield wipers.

24. The data processing system of claim 14, wherein the sensors include sensors for monitoring temperature.

25. A computer program product for collecting data on traffic conditions from a distributed vehicle computing system having a plurality of vehicle computing systems, the computer program product comprising:

first instructions for collecting data regarding traffic conditions from each of the plurality of distributed vehicle computing systems, wherein each of the plurality of vehicle computing systems is located in a plurality of automobiles, wherein the data is collected data;

second instructions for comparing the collected data with current data regarding traffic conditions;

third instructions for identifying changes present between the collected data regarding traffic conditions with the current data regarding traffic conditions; and fourth instructions for sending the changes to selected vehicle computing systems selected from the plurality of vehicle computing systems.

* * * * *

UNITED STATES PATENT AND TRADEMARK OFFICE

CERTIFICATE OF CORRECTION

PATENT NO. : 6,304,816 B1
DATED : October 16, 2001
INVENTOR(S) : Berstis

It is certified that error appears in the above-identified patent and that said Letters Patent is hereby corrected as shown below:

<u>Drawings,</u>
Figures 1-6 are incorrect. Figures 7 and 8 are correct. Please replace Figures 1-6 with the attached.

<u>Column 2,</u>
Line 63, after “phone”, please delete “systems” and insert -- system --.

<u>Column 10,</u>
Line 11, after “on”, please insert -- a --.

Signed and Sealed this

Twenty-sixth Day of November, 2002

*Attest:*

JAMES E. ROGAN

*Attesting Officer* *Director of the United States Patent and Trademark Office*

*FIG. 4*
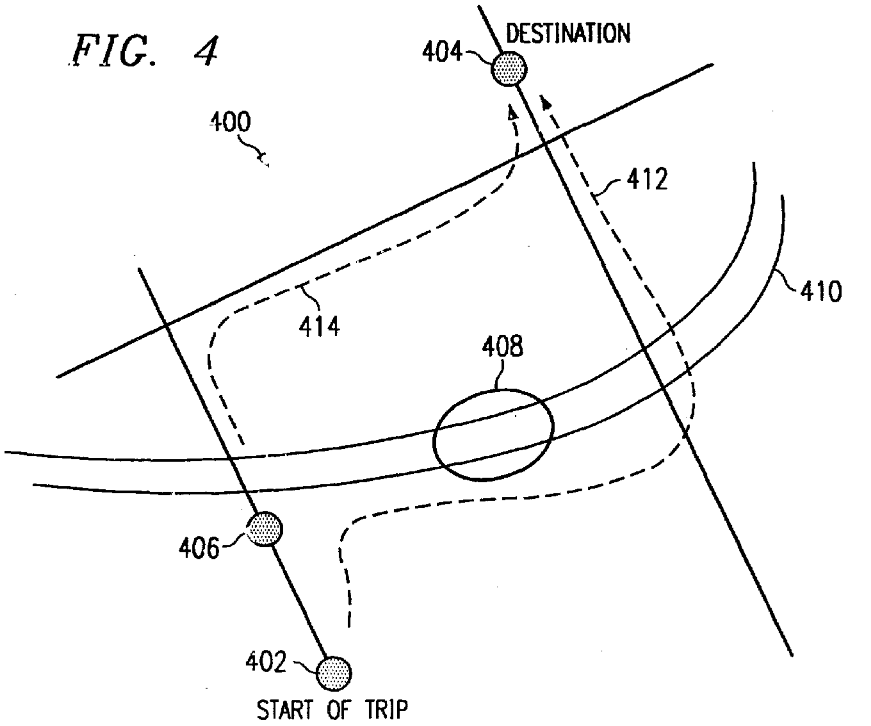
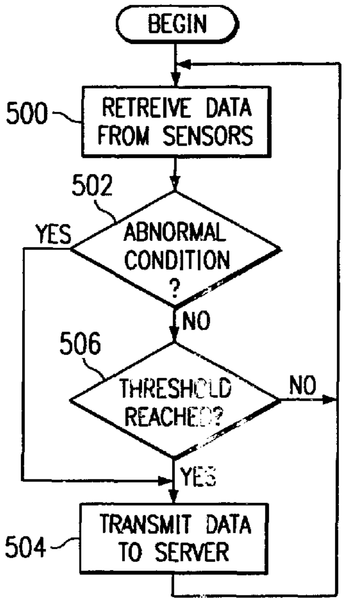
*FIG. 5*
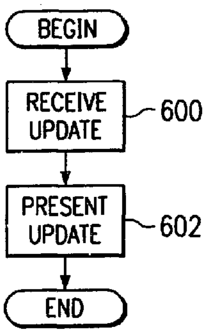
*FIG. 6*